(12) United States Patent
Hasegawa et al.

(10) Patent No.: US 11,841,529 B2
(45) Date of Patent: Dec. 12, 2023

(54) OPTICAL FIBER AND OPTICAL CABLE

(71) Applicant: SUMITOMO ELECTRIC INDUSTRIES, LTD., Osaka (JP)

(72) Inventors: Takemi Hasegawa, Osaka (JP); Yuki Kawaguchi, Osaka (JP); Masato Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/754,682

(22) PCT Filed: Oct. 13, 2020

(86) PCT No.: PCT/JP2020/038650
§ 371 (c)(1),
(2) Date: Apr. 8, 2022

(87) PCT Pub. No.: WO2021/079788
PCT Pub. Date: Apr. 29, 2021

(65) Prior Publication Data
US 2023/0228936 A1    Jul. 20, 2023

(30) Foreign Application Priority Data
Oct. 24, 2019   (JP) ................. 2019-193666

(51) Int. Cl.
*G02B 6/02*   (2006.01)

(52) U.S. Cl.
CPC ......... *G02B 6/023* (2013.01); *G02B 6/02023* (2013.01); *G02B 6/02285* (2013.01); *G02B 6/02395* (2013.01)

(58) Field of Classification Search
CPC ............ G02B 6/02285; G02B 6/02023; G02B 6/023; G02B 6/02395
See application file for complete search history.

(56) References Cited

U.S. PATENT DOCUMENTS

| 9,995,873 B2 | 6/2018 | Bickham et al. |
| 2006/0045450 A1 | 3/2006 | Bickham |

(Continued)

FOREIGN PATENT DOCUMENTS

| JP | 2010-503019 A | 1/2010 |
| JP | 2018-045028 A | 3/2018 |

(Continued)

OTHER PUBLICATIONS

International Search Report dated Dec. 8, 2020 issued in Patent Application No. PCT/JP2020/038650.

*Primary Examiner* — Sung H Pak
(74) *Attorney, Agent, or Firm* — PEARNE & GORDON LLP

(57) ABSTRACT

The present disclosure relates to an optical fiber or the like that can be adapted to an optical transceiver for a short wavelength band of 850 nm or more and 1060 nm or less while maintaining compatibility with an SMF of the related art. An optical fiber of one embodiment includes a core, a cladding, and a resin coating, and has a mode field diameter of 8.2 μm or more and 9.6 μm or less at a wavelength of 1310 nm, a cable cutoff wavelength of an LP11 mode of 1060 nm or more and 1260 nm or less, and a cable cutoff wavelength of an LP02 mode of 1060 nm or less.

12 Claims, 4 Drawing Sheets

(56) References Cited

U.S. PATENT DOCUMENTS

| | | | |
|---|---|---|---|
| 2007/0053642 A1* | 3/2007 | Mishra | G02B 6/0365 385/127 |
| 2007/0196061 A1 | 8/2007 | Bickham et al. | |
| 2008/0056658 A1 | 3/2008 | Bickham et al. | |
| 2018/0074258 A1 | 3/2018 | Morita et al. | |
| 2020/0333528 A1 | 10/2020 | Kawaguchi et al. | |

FOREIGN PATENT DOCUMENTS

| | | |
|---|---|---|
| JP | 2019-120894 A | 7/2019 |
| WO | 2008-027351 A2 | 3/2008 |
| WO | 2019-122943 A1 | 6/2019 |

\* cited by examiner

OPTICAL FIBER AND OPTICAL CABLE

TECHNICAL FIELD

The present disclosure relates to an optical fiber and an optical cable.

This application claims the priority of Japanese Patent Application No. 2019-193666 filed on Oct. 24, 2019, which is relied upon and incorporated herein by reference in its entirety.

BACKGROUND ART

In an optical communication system including a combination of an optical cable and an optical transceiver, there is a problem that a ratio of system transmission performance to a cost required for system construction is maximized. In general, for long-haul transmission exceeding about 100 km, an erbium doped fiber amplifier (EDFA) having excellent cost effectiveness is adopted due to a need for an optical amplifier. An optical cable including a plurality of single mode fibers (hereinafter, referred to as "SMF") for a wavelength band of 1530 nm or more and 1625 nm or less is adopted as a transmission medium. On the other hand, due to high cost required for manufacturing and laying a cable having a long transmission distance, it is now common to adopt a high-performance coherent optical transceiver even at high price. On the other hand, in short-haul transmission of less than 100 km, particularly less than 10 km, adoption of a lower cost optical transceiver is intended, and an optical cable adapted to the lower cost optical transceiver is sometimes used. The most typical example is a combination of an optical transceiver using a multimode vertical cavity surface emitting laser (VCSEL) and an optical cable including a plurality of multimode fibers (hereinafter, referred to as "MMF"). Such an optical communication system is particularly applied to extremely short-haul transmission of less than 100 in due to excellence in cost reduction of the optical transceiver and optical connection.

Patent Document 1 discloses an optical fiber capable of performing a single mode operation in a short wavelength band such as a wavelength band of 850 nm, a wavelength band of 980 nm, or a wavelength band of 1060 nm, and having a large effective area of 30 μm$^2$ or more and 110 μm$^2$ or less in the short wavelength band. The above-described optical characteristics (effective area in the short wavelength band) are realized by, for example, an optical fiber including a core having a radius of 3.0 μm or more and 6.0 μm or less and a relative refractive index difference of 0.12% or more and 0.35% or less, and a depressed cladding having a relative refractive index difference of −0.1% or less and a trench volume of 20%·μm$^2$ or more. Such an optical fiber is suitable for combination with an optical transceiver using a single-mode VCSEL for a wavelength band of 850 nm or more and 1060 nm or less. Since the optical transceiver using the single-mode VCSEL is inexpensive and can perform high-speed transmission, it is expected that cost effectiveness related to system construction can be improved.

CITATION LIST

Patent Literature

Patent Document 1: U.S. Pat. No. 9,995,873
Patent Document 2: Japanese Patent Application Laid-Open No. 2018-45028

SUMMARY OF INVENTION

An optical fiber according to an embodiment of the present disclosure includes a core, a cladding, and a resin coating. The core extends along a fiber axis (central axis) and is comprised of silica glass. The cladding is provided on an outer peripheral surface of the core, is comprised of silica glass, and has a maximum refractive index lower than a maximum refractive index of the core. The resin coating is provided on an outer peripheral surface of the cladding. The optical fiber having such a structure has a mode field diameter of 8.2 μm or more and 9.6 μm or less at a wavelength of 1310 nm, a cable cutoff wavelength of an LP11 mode of 1060 nm or more and 1260 nm or less, and a cable cutoff wavelength of an LP02 mode of 1060 nm or less.

DESCRIPTION OF EMBODIMENTS

Figure 1:
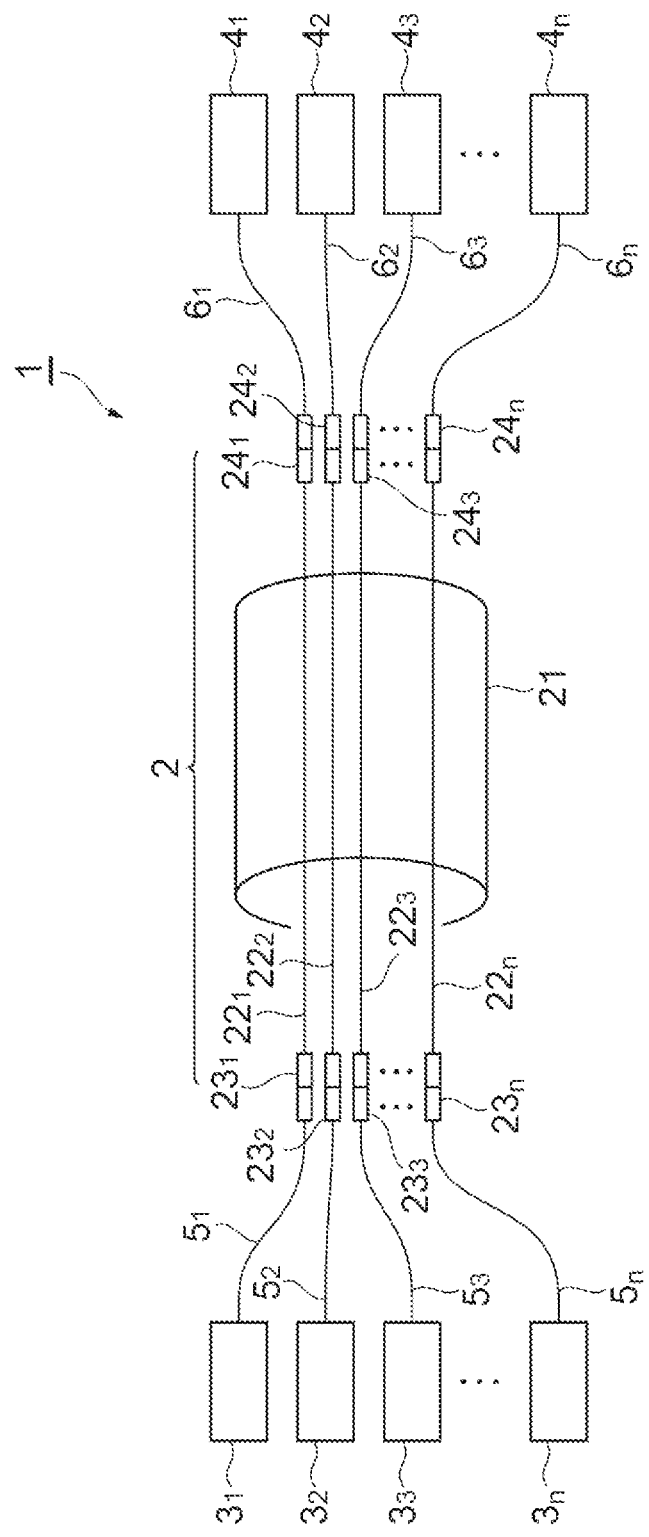
FIG. 1 is a diagram illustrating an example of a configuration of an optical communication system to which an optical fiber cable according to an embodiment of the present disclosure is applicable.

Problem to be Solved by Present Disclosure

The inventors have found the following problems as a result of examining the above-mentioned related art. That is, when the optical fiber of Patent Document 1 is adopted for the long-haul transmission of the related art in the wavelength band of 1310 nm or more and 1625 nm or less, since a high connection loss occurs due to a high bending loss or a small mode field diameter, there is no compatibility with the single mode fiber of the related art. This is because, in the optical fiber of Patent Document 1, the single mode operation is required in the short wavelength band such as a wavelength band of 850 nm, a wavelength band of 980 nm, or a wavelength band 1060 nm. Technically, the bending loss can be reduced by sequentially arranging an inner cladding, a trench layer, and an outer cladding outside the core and lowering a refractive index of the trench layer. However, the manufacturing of such a multilayer cladding structure has a problem of low productivity.

When an optical cable including the optical fiber of Patent Document 1 is laid, it is possible to obtain cost effectiveness by using the high-performance optical transceiver for the wavelength band of 850 nm or more and 1060 nm or less immediately after the laying. However, it is also necessary to consider a case where a technology of the optical transceiver for the wavelength band of 1310 nm or more and 1625 nm or less is developed in the future. That is, when it is necessary to combine the optical fiber of Patent Document 1 with the optical transceiver for the wavelength band of 1310 nm or more and 1625 nm or less, it is obvious that transmission performance by such a combination is inferior to transmission performance of a combination of the optical transceiver for the wavelength band of 1310 nm or more and 1625 nm or less and the optical cable including the SMF of the related art. Relaying the optical cable is one solution, but in this case, there is a problem that the cost of relaying the optical cable increases as the number of cores (the number of optical fibers housed in the optical cable) increases and a transmission distance increases.

The present disclosure has been made to solve the above-described problems, and an object of the present disclosure is to provide an optical fiber and an optical cable that can be adapted to an optical transceiver for a short wavelength band of 850 nm or more and 1060 nm or less while maintaining compatibility with an SMF of the related art.

Effects of Present Disclosure

According to the optical fiber and the optical cable of the present disclosure, it is possible to construct an optical transmission line capable of coping with a low-cost optical transceiver for a wavelength band of 850 nm or more and 1060 nm or less while maintaining compatibility with the SMF of the related art (medium for the long-haul transmission of the related art in the wavelength band of 1310 nm or more and 1625 nm or less).

Description of Embodiment of Present Disclosure

First, contents of an embodiment of the present disclosure will be individually listed and described.

(1) As one aspect, an optical fiber according to an embodiment of the present disclosure includes a core, a cladding, and a resin coating.

The core extends along a fiber axis (central axis) and is comprised of silica glass. The cladding is provided on an outer peripheral surface of the core, is comprised of silica glass, and has a maximum refractive index lower than a maximum refractive index of the core. The resin coating is provided on an outer peripheral surface of the cladding. The optical fiber having such a structure has a mode field diameter of 8.2 μm or more and 9.6 μum or less at a wavelength of 1310 nm, a cable cutoff wavelength of an LP11 mode of 1060 nm or more and 1260 nm or less, and a cable cutoff wavelength of an LP02 mode of 1060 nm or less. In the present specification, a relative refractive index difference Δof a certain medium (refractive index n) with pure silica glass (refractive index n0) as a reference is given as follows.

$$\Delta = (n/n0) - 1$$

A cutoff wavelength of a predetermined mode is defined as a minimum value of a wavelength at which a transmission loss of the mode is 19.3 dB or more in an optical fiber having a predetermined length in a predetermined bent state. In the case of the cable cutoff wavelength, measurement is performed in a state where a bend having a diameter of 80 mm is applied to both end portions having a length of 1 in of an optical fiber having a length of 22 in one turn at a time and an intermediate portion having a length of 20 in is wound around a diameter of 280 mm The optical fiber operates in a single mode at a wavelength of 1260 nm or more, operates in two LP modes of LP01 and LP11 at a wavelength of 1060 nm or more and 1260 nm or less, and operates in three or more LP modes including LP01, LP02, and LP11 at a wavelength of 1060 nm or less. Since the LP11 mode is an odd mode and the LP01 mode is an even mode, it is possible to suppress mode coupling between the LP01 mode and the LP11 mode by suppressing an axial deviation and an angular deviation at a connection point. On the other hand, since the LP02 mode is the even mode as in the LP11 mode, even though the axial deviation and the angular deviation are suppressed, mode coupling between the LP01 mode and the LP02 mode may occur due to variations in a core diameter and NA. Accordingly, it is possible to effectively increase a lower limit wavelength operating in the single mode from 1260 nm to 1060 nm by suppressing the axial deviation and the angular deviation at the connection point.

In the optical fiber, the amount of eccentricity of a core center from a cladding center is preferably 0.5 μm or less, and more preferably 0.3 μm or less. Non-circularity of the cladding is preferably 1.0% or less, and more preferably 0.7% or less. As a result, it is possible to effectively increase a lower limit wavelength operating in the single mode from 1260 nm to 1060 nm by suppressing the axial deviation and the angular deviation at the connection point.

With this configuration, the optical fiber enables signal transmission in a wider wavelength band as a transmission medium capable of coping with high-speed transmission in a short wavelength band around a wavelength of 1060 nm while maintaining compatibility with the SMF for the long-haul transmission of the related art (SMF of the related art) in the wavelength band of 1310 nm or more and 1625 nm or less.

(2) As one aspect of the optical fiber according to the embodiment of the present disclosure, the cable cutoff wavelength of the LP02 mode may be 980 nm or less. In this case, the signal transmission in the wider wavelength band is also enabled as the transmission medium capable of coping with the high-speed transmission in the short wavelength band around a wavelength of 980 nm while maintaining compatibility with the SMF of the related art as described above.

In the optical fiber, the amount of eccentricity of a core center from a cladding center is preferably 0.5 μm or less, and more preferably 0.3 μm or less. Non-circularity of the cladding is preferably 1.0% or less, and more preferably 0.7% or less. As a result, it is possible to effectively increase the lower limit wavelength operating in the single mode from 1260 nm to 980 nm by suppressing the axial deviation and the angular deviation at the connection point.

(3) As one aspect of the optical fiber according to the embodiment of the present disclosure, the cable cutoff wavelength of the LP02 mode may be 850 nm or less. In this case, the signal transmission in the wider wavelength band is also enabled as the transmission medium capable of coping with the high-speed transmission in the short wavelength band around a wavelength of 850 nm while maintaining compatibility with the SMF of the related art as described above.

In the optical fiber, the amount of eccentricity of a core center from a cladding center is preferably 0.5 μn or less, and more preferably 0.3 μm or less. Non-circularity of the cladding is preferably 1.0% or less, and more preferably 0.7% or less. As a result, it is possible to effectively increase the lower limit wavelength operating in the single mode from 1260 nm to 850 nm by suppressing the axial deviation and the angular deviation at the connection point.

(4) As one aspect of the optical fiber according to the embodiment of the present disclosure, a bending loss at a diameter of 15 mm is preferably 1 dB/turn or less at a wavelength of 1625 nm. The cladding may include an inner cladding provided on an outer peripheral surface of the core and an outer cladding provided on an outer peripheral surface of the inner cladding and having a relative refractive index difference higher than a relative refractive index difference of the inner cladding. In this case, the optical fiber can cope with the high-speed transmission in a short wavelength band of 850 nm or more and 1060 nm or less and can also cope with high spatial density and high-speed transmission at a wavelength of 1625 nm.

(5) As one aspect of the optical fiber according to the embodiment of the present disclosure, mode dispersion between an LP01 mode and the LP11 mode is preferably 1000 ps/km or less in a wavelength range of 850 nm or more and 1060 nm or less. In this case, even when the LP11 mode is excited by low quality connection or the like in a wide wavelength range of 850 nm or more and 1060 nm or less, generation of noise (noise for the LP01 mode) caused by the LP11 mode is effectively suppressed, and thus, stable high-speed transmission can be realized.

(6) As one aspect of the optical fiber according to the embodiment of the present disclosure, mode dispersion between an LP01 mode and the LP11 mode is preferably 300 ps/km or less at least one wavelength in a wavelength range of 850 nm or more and 1060 nm or less. Even in this case, even when the LP11 mode is excited by low quality connection or the like, the generation of noise caused by the LP 11 mode is effectively suppressed, and as a result, stable high-speed transmission can be realized.

(7) As one aspect of the optical fiber according to the embodiment of the present disclosure, a value $3\sigma$ defined by a standard deviation $\sigma$ of a variation in an outer diameter of the cladding along the fiber axis (outer diameter variation) preferably falls within a range of 0.1 µm or more and 0.5 µm or less. Here, the standard deviation $\sigma$ is represented by a cladding outer diameter $d(z)$ at a position z in a fiber axial direction, and when average values of $d(z)$ and $d2(z)$ over a length L of 100 km or more are represented by $<d>$ and $<d2>$, respectively, the standard deviation $\sigma$ is defined by $\sigma = \{<d2> - <d>^2\}$. The value $3\sigma$ more preferably falls within a range of 0.2 µm or more and 0.5 µm or less. When an upper limit of $3\sigma$ of the outer diameter variation is 0.5 µm or less, mode coupling due to structural variation of the fiber can be suppressed to a low level. On the other hand, since a long cooling time can be secured when a lower limit of $3\sigma$ is 0.1 µm or more and a longer cooling time can be secured when the lower limit is 0.2 µm or more, the transmission loss can be suppressed to be low. Thus, when $3\sigma$ falls within the above range, it is possible to realize long distance and high speed transmission.

In the outer diameter variation of the optical fiber, an outer diameter variation due to the contribution of a frequency component having a cycle of 0.1 mm or more and 100 mm or less preferably falls within a range of 0.1 µm or more and 0.5 µm or less. In many high-order modes, since a reciprocal of a propagation constant difference with the LP01 mode is 0.1 mm or more and 100 mm or less, an outer diameter variation due to the contribution of a specific frequency component as described above falls within the above range. Thus, the mode coupling and the transmission loss are suppressed to be low, and the transmission over a long distance and at a high speed can be realized. The optical fiber is usually twisted in a longitudinal direction by torque application during drawing in order to suppress polarization mode dispersion, but a rotation speed of the twist is preferably 0 times/m or more and 10 times/m or less. Since the outer diameter variation is likely to occur in synchronization with rotation, it is possible to suppress mode coupling and transmission loss to be low by setting the rotation speed within the above range.

(8) As one aspect of the optical fiber according to the embodiment of the present disclosure, in the optical fiber, since the mode field diameter of 8.2 µm or more and 9.6 µm or less at a wavelength of 1310 nm, the cable cutoff wavelength of the LP11 mode of 1060 nm or more and 1260 nm or less, and the cable cutoff wavelength of the LP02 mode of 1060 nm or less are realized, a core radius (or an outer diameter) and a refractive index profile shape are adjusted. Specifically, a radius of the core defined along a radial direction orthogonal to the fiber axis is preferably 3 µm or more and 10 µm or less (the outer diameter of the core defined in a diametrical direction orthogonal to the fiber axis is 6 µm or more and 20 µm or less). In an inner region (region surrounded by an outer peripheral surface that is around the fiber axis as a center and is separated from the fiber axis by 0.2 times the radius of the core) of the core, a refractive index profile of the core preferably has a shape adjusted such that a relative refractive index difference at a center of the core coinciding with the fiber axis is 0.8 times or more a maximum relative refractive index difference of the core (shape in which the depression of the refractive index profile is improved). In an outer region of the core surrounding the inner region, the refractive index profile of the core has a shape in which a relative refractive index difference $\Delta 0$ defined in the inner region in which a distance $r0$ along the radial direction is 0.2 times or less a distance $r1$ corresponding to the core radius, the relative refractive index difference $\Delta 0$ being a relative refractive index difference at a portion separated from the fiber axis by the distance $r0$ along the radial direction, a relative refractive index difference $\Delta 1$ at a portion separated from the fiber axis by the distance $r1$, and a relative refractive index difference $\Delta_r$ at a portion separated from the fiber axis by a distance r equal to or greater than the distance $r0$ and equal to or less than the distance $r1$ satisfy a relationship approximated by the following Formula (1):

$$\Delta_r = \Delta 0 + (\Delta 1 - \Delta 0) \times ((r - r0)/(r0 - r0))^{\alpha} \quad (1).$$

Here, the "relationship approximated" is defined as that a value on a left side of the above Formula (1) falls within a range of ±5% as a relative value with a value on a right side as a center. At radius $r \leq r0$, $\Delta_r$ is approximately equal to $\Delta 0$. In particular, the exponent $\alpha$ in the above Formula (1) is adjusted to 2.0 or more and 20 or less, as described above, the mode field diameter at a wavelength of 1310 nm is 8.2 µm or more and 9.6 µm or less, the cable cutoff wavelength of the LP11 mode is 1060 nm or more and 1260 nm or less, and the cable cutoff wavelength of the LP02 mode is 1060 nm or less.

(9) As one aspect of the optical fiber according to the embodiment of the present disclosure, the exponent $\alpha$ in the above formula is preferably 2.5 or more and 5.0 or less. In this case, even when the LP11 mode is excited by low quality connection or the like, the generation of noise caused by the LP11 mode is effectively suppressed, and as a result, stable high-speed transmission can be realized.

(10) As one aspect, an optical cable according to an embodiment of the present disclosure includes a plurality of optical fibers and a sheath surrounding the plurality of optical fibers. In particular, each of at least two optical fibers of the plurality of optical fibers includes a core, a cladding, and a resin coating. The core extends along a fiber axis and is comprised of silica glass. The cladding is provided on an outer peripheral surface of the core, is comprised of silica glass, and has a maximum refractive index lower than a maximum refractive index of the core. The resin coating is provided on an outer peripheral surface of the cladding. In particular, at least two optical fibers having such a structure have a mode field diameter of 8.2 µm or more and 9.6 µm or less at a wavelength of 1310 nm, a cable cutoff wavelength of an LP11 mode of 1060 nm or more and 1260 nm or less, and a cable cutoff wavelength of an LP02 mode of 1060 nm or less. In this case, the optical cable can also cope with an optical transceiver applied to optical communication at a wavelength of 1060 nm (optical communication at a wavelength of 1060 nm is enabled) in addition to the optical transceiver of the related art applied to optical communication in the wavelength band of 1310 nm or more and 1625 nm or less.

(11) As one aspect of the optical cable according to the embodiment of the present disclosure, in each of at least two optical fibers, the cable cutoff wavelength of the LP02 mode is preferably 980 nm or less. In this case, the optical cable can also cope with an optical transceiver applied to optical communication at a wavelength of 980 nm in addition to the conventional optical transceiver applied to optical communication in the wavelength band of 1310 nm or more and 1625 nm or less.

(12) As one aspect of the optical cable according to the embodiment of the present disclosure, in each of at least two optical fibers, the cable cutoff wavelength of the LP02 mode may be 850 nm or less. In this case, the optical cable can also cope with an optical transceiver at a wavelength of 850 nm in addition to an optical transceiver applied to optical communication in a wavelength band of 1310 nm or more and 1625 nm or less.

(13) As one aspect of the optical cable according to the embodiment of the present disclosure, in each of at least two optical fibers, a bending loss at a diameter of 15 mm is preferably 1 dB/turn or less at a wavelength of 1625 nm. In this case, the optical cable can also cope with high-speed transmission at a high spatial density in a wavelength band of 1310 nm or more and 1625 nm or less in addition to coping with an optical transceiver applied to optical communication in a wavelength band of 850 nm or more and 1060 nm or less.

(14) As one aspect of the optical cable according to the embodiment of the present disclosure, in each of at least two optical fibers, the core radius (or outer diameter) and the refractive index profile shape are adjusted in order to realize a mode field diameter of 8.2 µm or more and 9.6 µm or less at a wavelength of 1310 nm, the cable cutoff wavelength of the LP11 mode of 1060 nm or more and 1260 nm or less, and the cable cutoff wavelength of the LP02 mode of 1060 nm or less. Specifically, the radius of the core defined along the radial direction orthogonal to the fiber axis is preferably 3 µm or more and 10 µm or less (The core outer diameter is 6 µm or more and 20 µm or less). In the inner region (region surrounded by an outer peripheral surface that is around the fiber axis as a center and is separated from the fiber axis by 0.2 times the radius of the core) of the core, a refractive index profile of the core preferably has a shape adjusted such that a relative refractive index difference at a center of the core coinciding with the fiber axis is 0.8 times or more a maximum relative refractive index difference of the core (shape in which the depression of the refractive index profile is improved). In an outer region of the core surrounding the inner region, the refractive index profile of the core has a shape in which a relative refractive index difference $\Delta 0$ defined in the inner region in which a distance r0 along the radial direction is 0.2 times or less a distance r1 corresponding to the core radius, the relative refractive index difference $\Delta 0$ being a relative refractive index difference at the portion separated from the fiber axis by the distance r0 along the radial direction, the relative refractive index difference $\Delta 1$ at the portion separated from the fiber axis by the distance r1, and a relative refractive index difference $\Delta_r$ at a portion separated from the fiber axis by a distance r equal to or greater than the distance r0 and equal to or less than the distance r1 satisfy a relationship approximated by the above Formula (1). In particular, the exponent $\alpha$ in the above formula is adjusted to 2.0 or more and 20 or less, as described above, the mode field diameter at a wavelength of 1310 nm becomes 8.2 µm or more and 9.6 µm or less, the cable cutoff wavelength of the LP11 mode becomes 1060 nm or more and 1260 nm or less, and the cable cutoff wavelength of the LP02 mode becomes 1060 nm or less.

(15) As one aspect of the optical cable according to the embodiment of the present disclosure, the exponent $\alpha$ in the above formula is preferably 2.5 or more and 5.0 or less. In this case, even when the LP11 mode is excited by low quality connection or the like, the generation of noise caused by the LP11 mode is effectively suppressed, and as a result, stable high-speed transmission can be realized.

As described above, each of the aspects listed in the [Description of Embodiments of the Present Disclosure] is applicable to each of all the remaining aspects or all combinations of these remaining aspects.

Details of Embodiment of Present Disclosure

Specific examples of an optical fiber and an optical cable according to the present disclosure will be described in detail below with reference to the accompanying drawings. The present invention is not limited to these examples, and is intended to be defined by the claims and to include all modifications within the scope of the claims and their equivalents. In the description of the drawings, the same components are denoted by the same reference signs, and the redundant description will be omitted.

FIG. 1 is a diagram illustrating an example of a configuration of an optical communication system to which an optical fiber cable according to the embodiment of the present disclosure is applicable. An optical communication system 1 illustrated in FIG. 1 includes an optical cable 2 as a transmission medium, n optical transceivers $3_1$, $3_2$, $3_3$, . . . , and $3_n$ arranged on one end portion side of the optical cable 2, and n optical transceivers $4_1$, $4_2$, $4_3$ . . . , and $4_n$ arranged on the other end portion side of the optical cable 2. Here, "n" is an integer of 2 or more and 100,000 or less, and a lower limit condition of the integer "n" may be preferably 10 or more, 100 or more, or 1000 or more. In connection optical wirings (optical fibers) $5_1$, $5_2$, $5_3$, . . . , and $5_n$ extend from the n optical transceivers $3_1$, $3_2$, $3_3$, . . . , and $3_n$, respectively, and n connection optical wirings (optical fibers) $6_1$, $6_2$, $6_3$, . . . , and $6_n$ extend from the n optical transceivers $4_1$, $4_2$, $4_3$ . . . , and $4_n$, respectively.

The optical cable 2 includes n optical fibers $22_1$, $22_2$, $22_3$, . . . , and $22_n$ and a sheath 21 that houses the n optical fibers. In order to facilitate handling, the n optical fibers $22_1$, $22_2$, $22_3$, . . . , and $22_n$ may be divided into a plurality of groups, each of the optical fiber groups may be individually ribbonized, and then the plurality of ribbons obtained may be unitized.

One end portions of the n optical fibers $22_1$, $22_2$, $22_3$, . . . , and $22_n$ are connected to the n connection optical wirings $5_1$, $5_2$, $5_3$, . . . , and $5_n$ extending from the n optical transceivers $3_1$, $3_2$, $3_3$, . . . , and $3_n$ via n optical connectors $23_1$, $23_2$, $23_3$, ..., and $23_n$, respectively. The other end portions of the n optical fibers $22_1$, $22_2$, $22_3$, ..., and $22_n$, are connected to the n connection optical wirings $6_1$, $6_2$, $6_3$, ..., and $6_n$ extending from the n optical transceivers $4_1$, $4_2$, $4_3$, ..., and $4_n$ via n optical connectors $24_1$, $24_2$, $24_3$, ..., and $24_n$, respectively. Here, the optical connector $23_k$ (k=1, 2, 3, ..., and n) includes a structure having a positioning mechanism for fixing one end portion of the optical fiber $22_k$ (k=1, 2, 3, ..., and n) and the end portion of the connection optical wiring $5_k$ (k=1, 2, 3, ..., and n) in an optically connected state (this structure itself functions as an optical connector). Similarly, the optical connector $24_k$ (k=1, 2, 3, ..., and n) includes a structure having a positioning mechanism for fixing the other end portion of the optical fiber $22_k$ and the end portion of the connection optical wiring $6_k$ (k=1, 2, 3, ..., n) in an optically connected state. In the example of FIG. 1, although a single core connector structure that realizes optical connection of one optical fiber by one optical connector is illustrated, a multi-core connector structure that realizes optical connection of a plurality of optical fibers by one optical connector may be adopted.

In each of the n optical fibers $22_1$, $22_2$, $22_3$, ..., and $22_n$ illustrated in FIG. 1 or each of at least two of these optical fibers, a cable cutoff wavelength of an LP02 mode is 1060 nm or less, preferably 980 nm or less, and more preferably 850 nm or less. A cable cutoff wavelength of an LP11 mode is 1260 nm or less. A bending loss at a diameter of 15 mm is 1 dB/turn or less at a wavelength of 1625 nm. A mode field diameter at a wavelength of 1310 nm is 8.2 μm or more and 9.6 μm or less. By using the optical fiber having the above-described optical characteristics as the transmission medium, not only optical transmission by the optical transceiver in the wavelength band of 1260 nm or more and 1625 nm or less can be performed, but also optical transmission using an optical transceiver for a short wavelength band (wavelength range of 850 nm or more and 1060 nm or less) such as a wavelength band of 850 nm, a wavelength band of 980 nm, and a wavelength band of 1060 nm can be performed by managing mode coupling due to axial deviation and angular deviation at a connection portion (optical connector) to be low. As a result, a price-to-performance ratio of the optical communication system can be optimized by using an optical transceiver of an optimal wavelength band at each time without rewiring the optical cable.

It is preferable that mode dispersion is also optimized in each of the n optical fibers $22_1$, $22_2$, $22_3$, ..., and $22_n$ or in each of at least two of these optical fibers. Specifically, at a wavelength of 1060 nm, a wavelength of 980 nm, or a wavelength of 850 nm, the mode dispersion between the LP01 mode and the LP11 mode is 1000 ps/km or less, preferably 300 ps/km or less. In this case, even though the LP11 mode is excited by the axial deviation and the angular deviation in the connection, since the generation of noise (noise for the LP01 mode) caused by the LP11 mode is effectively suppressed, the transmission performance of the optical communication system 1 can be improved or the connection cost can be reduced.

It is most preferable that all the n optical fibers $22_1$, $22_2$, $22_3$, ..., and $22_n$ included in the optical cable 2 satisfy the above-described optical characteristics regarding the optical fiber. However, in accordance with a demand for the transmission performance and the manufacturing cost of the optical communication system 1, all optical fibers included in a target unit or a target ribbon may be configured to satisfy the optical characteristics for each unit constituting the optical cable 2 or each ribbon (one unit to be handled as the optical fiber group) constituting each unit, and thus, the price-to-performance ratio can be optimized.

Figure 2:
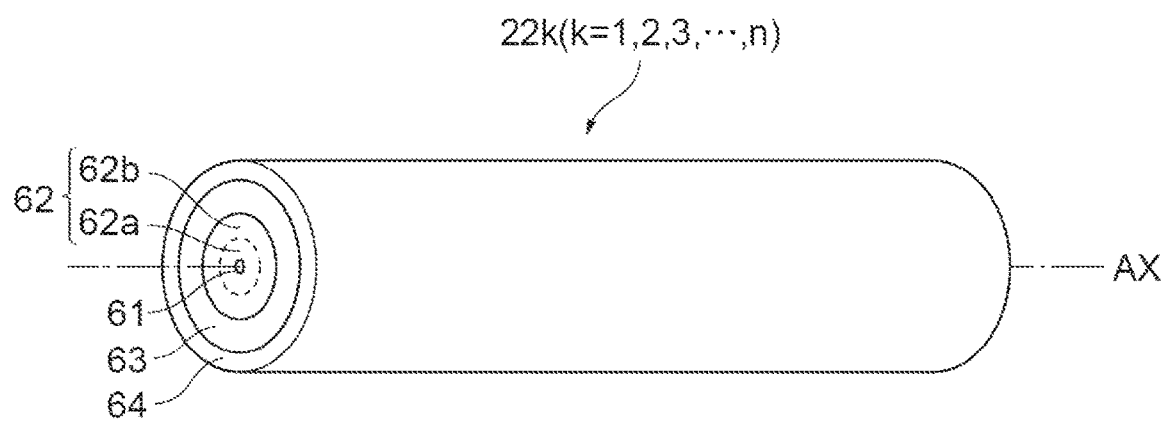
FIG. 2 is a diagram illustrating an example of a structure of an optical fiber according to the embodiment of the present disclosure.

FIG. 2 is a diagram illustrating an example of a structure of a k-th optical fiber $22_k$ (k=1, 2, 3, ..., and n) among the n optical fibers $22_1$, $22_2$, $22_3$, ..., and $22_n$ illustrated in FIG. 1. The structure illustrated in FIG. 2 need not be applied to all of the n optical fibers $22_1$, $22_2$, $22_3$, ..., and $22_n$ housed in the sheath 21 of the optical cable 2, and may be applied to at least two optical fibers.

The optical fiber $22_k$ includes a core 61 extending along a fiber axis (central axis) AX, a cladding 62 provided on an outer peripheral surface of the core 61, a first coating 63 provided on an outer peripheral surface of the cladding 62, and a second coating 64. The first coating 63 and the second coating 64 constitute a resin coating provided on the outer peripheral surface of the cladding 62.

In the example of FIG. 2, the cladding 62 includes an inner cladding 62a provided on the outer peripheral surface of the core and an outer cladding 62b provided on an outer peripheral surface of the inner cladding 62a. Here, the core 61 and the cladding 62 (the inner cladding 62a and the outer cladding 62b) are comprised of silica glass, and may contain dopant for adjusting a refractive index of Ge, F, Cl, Br, or P. The inner cladding 62a has a refractive index lower than a refractive index of the core 61. The outer cladding 62b has a refractive index lower than the refractive index of the core 61 and higher than the refractive index of the inner cladding. Accordingly, the core 61 has a maximum refractive index higher than a maximum refractive index of the cladding 62. A maximum relative refractive index difference (value based on pure silica glass) of the core 61 is 0.2% or more and 0.6% or less. An outer diameter of the core 61 is 6 μm or more and 20 μm or less. That is, a radius of the core 61 (distance from the fiber axis AX to an outer periphery of the core) is 3 μm or more and 10 μm or less. With such a core structure, the optical fiber has a single guided mode at a wavelength of 1260 nm (single mode operation can be performed). An outer diameter of the cladding 62 (an outer diameter of the outer cladding 62b) is preferably a standard outer diameter (glass outer diameter) of 124 μm or more and 126 μm or less. With such a core structure, the optical fiber $22_k$ can cope with high-speed transmission in a short wavelength band of 850 nm or more and 1060 nm or less and can also cope with high spatial density and high-speed transmission at a wavelength of 1625 nm.

The first coating 63 and the second coating 64 are comprised of a urethane acrylate-based ultraviolet curable resin. Preferably, the first coating has a thickness (a difference between an inner diameter and an outer diameter defined along a radial direction orthogonal to the fiber axis AX) of 15 μm or more and 40 μm or less and an elastic modulus of 0.05 MPa or more and 0.5 MPa or less. The second coating 64 has a thickness of 15 μm or more and 40 μm or less and an elastic modulus of 500 MPa or more and 2000 MPa or less. As a result, an external force applied to a glass portion (a portion constituted by the core 61 and the cladding 62) from a side of the optical fiber $22_k$ is effectively shielded.

Figure 3A:
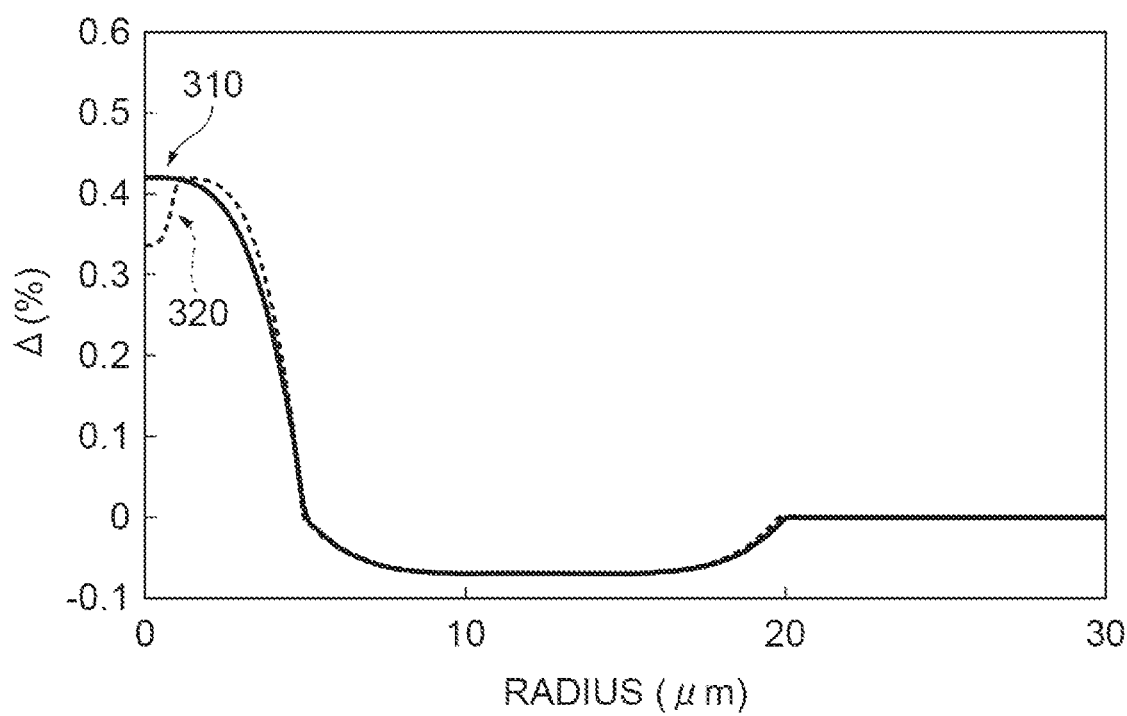
FIG. 3A is a refractive index profile of each of an example of the optical fiber according to the embodiment of the present disclosure and an optical fiber according to a comparative example.

Next, FIG. 3A illustrates refractive index profiles of an example of the optical fiber according to the embodiment of the present disclosure and an optical fiber according to a comparative example. In FIG. 3A, reference sign 310 denotes a refractive index profile of an optical fiber $22_k$ according to the embodiment of the present disclosure, and reference sign 320 denotes a refractive index profile of the optical fiber according to the comparative example.

In an inner region (a region surrounded by an outer peripheral surface that is around the fiber axis AX as a center and is separated from the fiber axis AX by 0.2 times the radius of the core 61) of the core 61, the refractive index profile 310 of the core 61 has a structure in which a depression of the refractive index profile 310 is reduced or removed such that a relative refractive index difference at the core center coinciding with the fiber axis AX becomes 0.8 times or more the maximum relative refractive index difference of the core 61. In an outer region of the core 61 surrounding the inner region, the refractive index profile 310 of the core 61 has a shape in which a relative refractive index difference Δ0 defined in the inner region where a distance r0 along the radial direction is equal to or less than 0.2 times a distance r1 corresponding to the core radius, the relative refractive index difference Δ0 being a relative refractive index difference at a portion separated from the fiber axis AX by the distance r0 along the radial direction, a relative refractive index difference Δ1 at a portion separated from the fiber axis AX by the distance r1, and a relative refractive index difference $\Delta_r$ at a portion separated from the fiber axis AX by a distance r equal to or greater than the distance r0 and equal to or less than the distance r1 satisfy a relationship approximated by the following Formula (2):

$$\Delta_r = \Delta 0 + (\Delta 1 - \Delta 0) \times ((r-r0)/(r1-0))^\alpha \quad (2).$$

At radius r≅r0, $\Delta_r$ is approximately equal to Δ0. In particular, an exponent α in the above Formula (2) is adjusted, and thus, as described above, the mode field diameter at a wavelength of 1310 nm is 8.2 μm or more and 9.6 μm or less, the cable cutoff wavelength of the LP11 mode is 1060 nm or more and 1260 nm or less, and the cable cutoff wavelength of the LP02 mode is 1060 nm or less.

Specifically, in the optical fiber $22_k$ according to the embodiment of the present disclosure, the core 61 is comprised of silica glass containing Ge and has a radius of 4.65 μm or more and 5.0 μm or less and a maximum relative refractive index difference of 0.42%±0.01%. A value of the exponent α of the above Formula (2) for determining a profile shape in the outer region is 3.4±0.1. The cladding 62 has a double cladding structure including the inner cladding 62a and the outer cladding 62b, and the inner cladding 62a is comprised of silica glass containing F and has a relative refractive index difference of −0.07%±0.01%. A ratio of (radius of core 61)/(outer radius of inner cladding 62a) is 0.25±0.02. The outer cladding 62b is comprised of pure silica glass and has an outer radius (cladding outer diameter) of 62.5 μm±0.5 μm.

On the other hand, the optical fiber according to the comparative example has a structure similar to the above-described optical fiber $22_k$ except for the profile shape of the inner region of the core 61. That is, in the inner region of the core, the refractive index profile 320 has a shape corresponding to the above Formula (2) (the relative refractive index difference at the core center is Δ0, the relative refractive index difference at the outer peripheral portion of the inner region is Δ1, and the index α is 3.4), and the relative refractive index difference Δ0 at the core center decreases to 0.8±0.1 times the maximum relative refractive index difference. Such a depression of the refractive index at the core center may occur due to the influence of a core manufacturing technology. On the other hand, in the refractive index profile 310 of the optical fiber $22_k$ according to the embodiment of the present disclosure, the depression of the refractive index at the core center is removed by adjusting a manufacturing condition. In particular, it is preferable to manufacture the core by a VAD method since the depression of the refractive index at the core center is suppressed. In the case of an OVD method and a CVD method, when a cylindrical glass body is solidified, the dopant is desorbed, and thus, the refractive index at the core center may be regressed. However, it is preferable that a large amount of dopant is added as much as the dopant is desorbed.

Figure 3B:
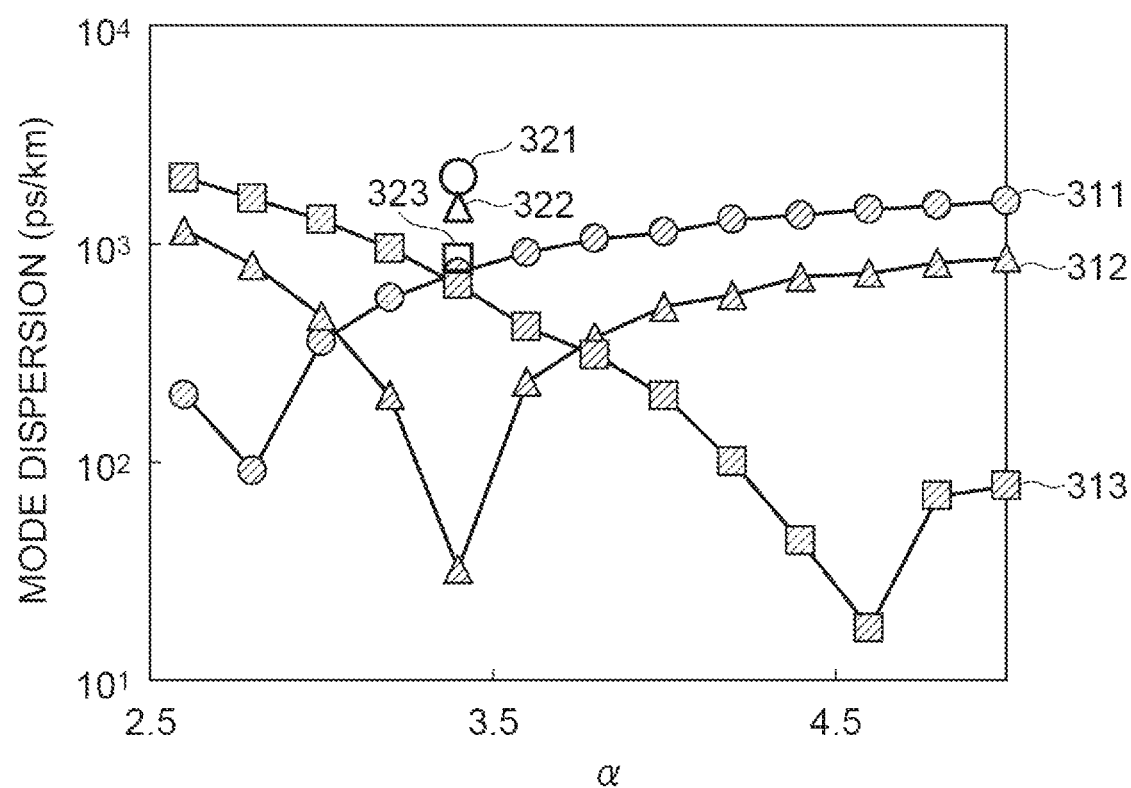
FIG. 3B is a graph representing a relationship between an exponent α and mode dispersion for each of a plurality of samples of the optical fiber according to the embodiment of the present disclosure and a plurality of comparative examples.

FIG. 3B is a graph representing a relationship between the exponent α and the mode dispersion for each of a plurality of samples and a plurality of comparative examples of the optical fiber $22_k$ (the optical fiber according to the embodiment of the present disclosure) having the above-described structure. Specifically, the graph represented in FIG. 3B shows changes in the mode dispersion of the samples and the comparative examples when the exponent α in the above Formula (2) is changed within a range of 2.6 or more and 5.0 or less.

In FIG. 3B, a graph 311 represents a measurement result (a relationship between the exponent α and the mode dispersion) of a first sample of the optical fiber $22_k$ in which the cable cutoff wavelength of the LP02 mode is set to 850 nm, a graph 312 represents a measurement result of a second sample of the optical fiber $22_k$ in which the cable cutoff wavelength of the LP02 mode is set to 980 nm, and a graph 313 represents a measurement result of a third sample of the optical fiber $22_k$ in which the cable cutoff wavelength of the LP02 mode is set to 1060 nm. On the other hand, a point 321 indicates a measurement result (a relationship between the exponent α and the mode dispersion) of a first comparative example in which the cable cutoff wavelength of the LP02 mode is set to 850 nm, a point 322 indicates a measurement result of a second comparative example in which the cable cutoff wavelength of the LP02 mode is set to 980 nm, and a point 323 indicates a measurement result of a third comparative example in which the cable cutoff wavelength of the LP02 mode is set to 1060 nm.

As can be seen from FIG. 3B, all of the first sample, the second sample, and the third sample of the optical fiber $22_k$ are suitable for high-speed transmission since the mode dispersion can be suppressed to 300 ps/km or less at an optimum value of the exponent α. The optimum value of the exponent α in the first sample is around 2.8±0.1, the optimum value of the exponent α in the second sample is around 3.4±0.1, and the optimum value of the exponent α in the third sample is around 4.6±0.1. The value of the exponent α is set to 3.4±0.1 (range of 3.3 or more and 3.5 or less), and thus, the mode dispersion can be suppressed to 1000 ps/km or less in all the wavelength bands of the wavelength band of 850 nm, the wavelength band of 980 nm, and the wavelength band of 1060 nm (wavelength range of 850 nm or more and 1060 nm or less). In this α, each of the graphs 311, 312, and 313 has a lower mode dispersion than the points 321, 322, and 323. This represents an effect of reducing the depression of the refractive index at the center of the core.

In the optical fiber $22_k$ according to the embodiment of the present disclosure, a value 3σ defined by a standard deviation σ of variations in the outer diameter (the outer diameter of the glass portion) of the cladding 62 (variations in an outer diameter along a longitudinal direction coinciding with the fiber axis AX) is preferably 0.1 μm or more and 0.5 μm or less. The value 3σ is more preferably 0.2 μm or more and 0.5 μm or less. When the value 3σ is 0.5 μm or less, noise due to mode coupling from the LP01 mode to the LP02 mode is effectively suppressed, and stable transmission performance can be maintained. As known in Patent Document 2, it is possible to suppress Rayleigh scattering to be low by drawing an optical fiber under a cooling condition in which the value 3σ is 0.1 μm or more, and it is possible to further suppress Rayleigh scattering to be low by drawing an optical fiber under a cooling condition in which the value is 0.2 μm or more.

REFERENCE SIGNS LIST 1 optical communication system
2 cable
$3_1, 3_2, 3_3, \ldots, 3_n$, and $3_k$ (k=1, 2, 3, ..., and n), $4_1, 4_2, 4_3, \ldots, 4_n$, and $4_k$ (k=1, 2, 3, ..., and n) optical transceiver
$5_1, 5_2, 5_3, \ldots, 5_n$, and $5_k$ (k=1, 2, 3, ..., and n), $6_1, 6_2, 6_3, \ldots, 6_n$, and $6_k$ (k=1, 2, 3, ..., and n) optical wiring (optical fiber)
$22_1, 22_2, 22_3, \ldots, 22_n$, and $22_k$ (k=1, 2, 3, ..., and n) optical fiber
$23_1, 23_2, 23_3, \ldots, 23_n$, and $23_k$ (k=1, 2, 3, ..., and n), $24_1, 24_2, 24_3, \ldots, 24_n$, and $24_k$ (k=1, 2, 3, ..., and n) optical connector
61 core
62 cladding
62a inner cladding
62b outer cladding
63 first coating
64 second coating
AX fiber axis (central axis).

The invention claimed is:

1. An optical fiber comprising:
a core extending along a fiber axis and comprised of silica glass;
a cladding provided on an outer peripheral surface of the core, comprised of silica glass, and having a maximum refractive index lower than a maximum refractive index of the core; and
a resin coating provided on an outer peripheral surface of the cladding, wherein
the optical fiber has a mode field diameter of 8.2 μm or more and 9.6 μm or less at a wavelength of 1310 nm, a cable cutoff wavelength of an LP11 mode of 1060 nm or more and 1260 nm or less, and a cable cutoff wavelength of an LP02 mode of 1060 nm or less, wherein
mode dispersion between an LP01 mode and the LP11 mode is 1000 ps/km or less in a wavelength range of 850 nm or more and 1060 nm or less, wherein
a radius of the core defined along a radial direction orthogonal to the fiber axis is 3 μm or more and 10 μm or less,
the core includes an inner region surrounded by an outer peripheral surface that is around the fiber axis as a center and is separated from the fiber axis by 0.2 times the radius of the core, and in the inner region, a refractive index profile of the core has a shape in which a relative refractive index at a core center coinciding with the fiber axis is 0.8 times or more a maximum refractive index difference of the core,
in an outer region of the core surrounding the inner region, the refractive index profile of the core has a shape in which a relative refractive index difference Δ0 defined in the inner region in which a distance r0 along the radial direction satisfies a relationship of 0≤r0/r1≤0.2 with respect to a distance r1 corresponding to the radius of the core, the relative refractive index difference Δ0 being a refractive index difference at a portion separated from the fiber axis by the distance r0, a relative refractive index difference Δ1 at a portion separated from the fiber axis by the distance r1, and a relative refractive index difference $\Delta_r$ at a portion separated from the fiber axis by a distance r equal to or greater than the distance r0 and equal to or less than the distance r1 satisfy a relationship approximated by the following formula including an exponent α of 2.0 or more and 20 or less:

$\Delta_r = \Delta 0 + (\Delta 1 - \Delta 0) \times ((r-r0)/(r1-r0))^\alpha$, and the mode field diameter at the wavelength of 1310 nm is 8.2 μm or more and 9.6 μm or less, the cable cutoff wavelength of the LP11 mode is 1060 nm or more and 1260 nm or less, and the cable cutoff wavelength of the LP02 mode is 1060 nm or less.

2. The optical fiber according to claim 1, wherein the cable cutoff wavelength of the LP02 mode is 980 nm or less.

3. The optical fiber according to claim 2, wherein the cable cutoff wavelength of the LP02 mode is 850 nm or less.

4. The optical fiber according to claim 1, wherein a bending loss at a diameter of 15 mm is 1 dB/turn or less at a wavelength of 1625 nm, and
the cladding includes: an inner cladding provided on an outer peripheral surface of the core; and an outer cladding provided on an outer peripheral surface of the inner cladding and having a relative refractive index difference higher than a relative refractive index difference of the inner cladding.

5. The optical fiber according to a claim 1, wherein mode dispersion between an LP01 mode and the LP11 mode is 300 ps/km or less at at least one wavelength in a wavelength range of 850 nm or more and 1060 nm or less.

6. The optical fiber according to claim 1, wherein a value 3σ defined by a standard deviation σ of a variation of an outer diameter of the cladding along the fiber axis falls within a range of 0.1 μm or more and 0.5 μm or less.

7. The optical fiber according to claim 1, wherein the exponent α is 2.5 or more and 5.0 or less.

8. An optical cable comprising:
a plurality of optical fibers; and
a sheath that surrounds the plurality of optical fibers,
wherein each of at least two optical fibers of the plurality of optical fibers includes a core extending along a fiber axis and comprised of silica glass, a cladding provided on an outer peripheral surface of the core, comprised of silica glass, and having a maximum refractive index lower than a maximum refractive index of the core, and a resin coating provided on an outer peripheral surface of the cladding, and
the optical cable has a mode field diameter of 8.2 μm or more and 9.6 μm or less at a wavelength of 1310 nm, a cable cutoff wavelength of an LP11 mode of 1060 nm or more and 1260 nm or less, and a cable cutoff wavelength of an LP02 mode of 1060 nm or less, wherein
mode dispersion between an LP01 mode and the LP11 mode is 1000 ps/km or less in a wavelength range of 850 nm or more and 1060 nm or less, wherein
in each of the at least two optical fibers,
a radius of the core defined along a radial direction orthogonal to the fiber axis is 3 μm or more and 10 μm or less,
the core includes an inner region surrounded by an outer peripheral surface that is around the fiber axis as a center and is separated from the fiber axis by 0.2 times the radius of the core, and in the inner region, a refractive index profile of the core has a shape in which a relative refractive index at a core center coinciding with the fiber axis is 0.8 times or more a maximum refractive index difference of the core, in an outer region of the core surrounding the inner region, the refractive index profile of the core has a shape in which a relative refractive index difference $\Delta 0$ defined in the inner region in which a distance r0 along the radial direction satisfies a relationship of $0 \leq r0/r1 \leq 0.2$ with respect to a distance r1 corresponding to the radius of the core, the relative refractive index difference $\Delta 0$ being a relative index difference at a portion separated from the fiber axis by the distance r0, a relative refractive index difference $\Delta 1$ at a portion separated from the fiber axis by the distance r1, and a relative refractive index difference $\Delta_r$ at a portion separated from the fiber axis by a distance r equal to or greater than the distance r0 and equal to or less than the distance r1 satisfy a relationship approximated by the following formula including the exponent $\alpha$ of 2.0 or more and 20 or less, and $$\Delta_r = \Delta 0 + (\Delta 1 - \Delta 0) \times ((r-r0)/(r1-r0))^\alpha$$

the mode field diameter at the wavelength of 1310 nm is 8.2 μm or more and 9.6 μm or less, the cable cutoff wavelength of the LP11 mode is 1060 nm or more and 1260 nm or less, and the cable cutoff wavelength of the LP02 mode is 1060 nm or less.

9. The optical cable according to claim 8, wherein the cable cutoff wavelength of the LP02 mode is 980 nm or less in each of the at least two optical fibers.

10. The optical cable according to claim 9, wherein the cable cutoff wavelength of the LP02 mode is 850 nm or less in each of the at least two optical fibers.

11. The optical cable according to claim 10, wherein a bending loss at a diameter of 15 mm is 1 dB/turn or less at a wavelength 1625 nm in each of the at least two optical fibers.

12. The optical cable according to claim 8, wherein the exponent $\alpha$ is 2.5 or more and 5.0 or less.

* * * * *